US 6,627,563 B1

(12) United States Patent
Huberty

(10) Patent No.: US 6,627,563 B1
(45) Date of Patent: Sep. 30, 2003

(54) OILY-MIST RESISTANT FILTER THAT HAS NONDECREASING EFFICIENCY

(75) Inventor: John S. Huberty, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 247 days.

(21) Appl. No.: 09/377,262

(22) Filed: Aug. 19, 1999

(51) Int. Cl.$^7$ .............................. B32B 27/12; D04H 1/56
(52) U.S. Cl. .......................... 442/91; 442/92; 442/400
(58) Field of Search ............................ 442/91, 92, 400

(56) References Cited

U.S. PATENT DOCUMENTS

| | | | |
|---|---|---|---|
| 4,118,531 A | | 10/1978 | Hauser |
| RE30,782 E | | 10/1981 | van Turnhout |
| 4,375,718 A | | 3/1983 | Wadsworth et al. |
| 4,536,440 A | | 8/1985 | Berg |
| 4,588,537 A | | 5/1986 | Klaase et al. |
| RE32,171 E | | 6/1986 | van Turnhout |
| 4,592,815 A | | 6/1986 | Nakao |
| 4,798,850 A | | 1/1989 | Brown |
| 5,025,052 A | | 6/1991 | Crater et al. |
| 5,401,446 A | | 3/1995 | Tsai et al. |
| 5,411,576 A | * | 5/1995 | Jones et al. ............ 95/57 |
| 5,472,481 A | | 12/1995 | Jones et al. |
| 5,496,507 A | | 3/1996 | Angadjivand et al. |
| 5,645,627 A | * | 7/1997 | Lifshutz et al. ............ 96/15 |
| 5,817,584 A | * | 10/1998 | Singer et al. ............ 442/345 |
| 5,908,598 A | | 6/1999 | Rousseau et al. |
| 5,919,847 A | | 7/1999 | Rousseau et al. |
| 5,968,635 A | | 10/1999 | Rousseau et al. |
| 5,976,208 A | | 11/1999 | Rousseau et al. |
| 6,002,017 A | | 12/1999 | Rousseau et al. |

FOREIGN PATENT DOCUMENTS

WO    WO 99/16532    4/1999

OTHER PUBLICATIONS

Trouihet, Y., *New Method of Manufacturing Nonwovens by Electrostatis Laying,* in Index 81 Congress Papers, Advances in Web Forming, European Disposables and Nonwovens Association, Amsterdam (May 5–7, 1981).
Wente, Van A., *Superfine Thermoplastic Fibers,* 48 Indus. Engn. Chem., 1342–46 (1956).
Wente, Van A., *Manufacture of Super Fine Organic Fibers,* Report No. 4364 of the Naval Research Laboratories (May 25, 1954).

* cited by examiner

*Primary Examiner*—Ula C. Ruddock
(74) *Attorney, Agent, or Firm*—Karl G. Hanson

(57) ABSTRACT

A filter that includes a first electret filter layer through which an airstream first passes before encountering a second electret filter layer. The first filter layer exhibits nondecreasing removal efficiency and removes a majority of a challenge aerosol; whereas the second layer exhibits decreasing removal efficiency and has an initial quality factor greater than the first layer. Together, the first and second electret filter layers can provide a filter that exhibits a nondecreasing removal efficiency and a relatively low pressure-drop. The filter can provide nondecreasing removal efficiency and reduced pressure drop even though the second electret filter layer exhibits decreasing removal efficiency in contrast to the desired nondecreasing removal efficiency for the filter as a whole.

29 Claims, 4 Drawing Sheets

OILY-MIST RESISTANT FILTER THAT HAS NONDECREASING EFFICIENCY

The present invention relates to a multilayer filter that exhibits nondecreasing efficiency when challenged with an oily-mist aerosol.

BACKGROUND

Persons who are exposed to air that contains toxic or noxious substances frequently wear a respirator that covers their nose and mouth to filter air before it is inhaled. Respirator design is regulated by the National Institute for Occupational Safety and Health (NIOSH). NIOSH establishes various removal efficiency standards for respirators that have been challenged with different contaminants. For example, a standard for oily-mist removal efficiency—using suspended droplets of dioctylphthalate (DOP)—must be met by filter media designated for use in environments where oil is present. Because removal efficiency may change in response to loading, the standards specify a minimum removal efficiency over a fixed exposure to a challenge aerosol. Although some respirator filter media provide nondecreasing—or even increasing—efficiency with continued exposure, removal efficiency of respirator filter media typically decreases as DOP exposure increases.

Effective July 1995, NIOSH instituted standards for non-powered air-purifying particulate respirators. See 42 C.F.R. Part 84 (published Jun. 8, 1995). The regulations include several different classifications, one of which is commonly referred to as "P-series" and is directed at filters that are intended for removal of oil-based liquid particulates. For a P-series certification, the respirator filter media must exhibit nondecreasing efficiency at the end point of a DOP removal efficiency test.

In addition to removal efficiency, respirator comfort is another parameter that is important to the respirator user. One indicator of respirator comfort is pressure-drop across the respirator filter media. Lower pressure-drop filters provide improved comfort to users by making it easier for the wearer to breathe and by allowing warm, moist exhaled-air to be more easily purged from a mask that does not possess an exhalation valve.

Although pressure drop is not substantially affected by environmental conditions, comfort differences between filters that have high and low pressure-drops do, however, become more pronounced under more severe environmental conditions, such as high heat and humidity. Under these conditions, the perceived pressure-drop—that is, the perceived effort to breathe through the respirator—can increase to uncomfortable levels. Perceived pressure-drop increases are a function of environmental conditions because users in more severe environmental conditions typically are more aware of the additional effort required to breathe than users in less severe environmental conditions. The increase in perceived pressure-drop reduces a user's comfort and may lead to reduced compliance with respirator use requirements, particularly in the more severe environmental conditions where respirator use is very important to a person's health and safety.

Pressure-drop can also be an important factor for filter media that is used in powered air-purifying respirators. Unlike negative pressure respirators, which rely on a wearer's lungs to draw air through the filter media, powered air-purifying respirators use an external power source to accomplish this task. Powered air-purifying respirator performance is measured by a number of parameters, including airflow and pressure-drop across the filter during operation. Airflow and pressure-drop are related because, for a given blower and power source, a filter that has a lower pressure-drop will deliver a higher airflow. Conversely, a filter with a higher pressure-drop will deliver lower airflow using the same blower and power source. Airflow and pressure-drop are important because a respirator system that has a higher pressure-drop filter requires more energy to deliver the same amount of filtered air than a respirator system that has a lower pressure-drop filter. As a result, a higher pressure-drop can result in reduced operating times for powered respirator systems that have fixed energy sources such as batteries.

Pressure-drop for a given airflow rate across a filter can be decreased by increasing the openness or looseness of the filter material. A filter in which the openness or looseness of the filter material is increased, however, typically exhibits reduced efficiency in removal of contaminants, which is yet another parameter by which respirator system performance is measured. Pressure-drop for a given airflow rate, in some circumstances, can also be reduced without decreasing the contaminant removal efficiency. This can be accomplished by increasing the size or surface area of the filter. Increasing filter size, however, typically also includes increasing the size and/or bulk of the system, which may potentially limit the wearer's mobility in confined areas.

Attempts to meet the need for P-series certified filters typically have relied on the use of filter media that exhibits nondecreasing removal efficiency. Some filters may include one or more layers that exhibit neutral removal efficiency in combination with one or more layers that exhibit nondecreasing removal efficiency to provide filters that exhibit nondecreasing removal efficiency. The neutral removal efficiency layer may be used as a prefilter to prevent caking of the filter layer(s) that provide nondecreasing removal efficiency and are typically selected for their low pressure drop characteristics. To provide a low pressure drop, the prefilter layers may require relatively high loft, which can substantially increase the filter thickness. As discussed above, increased filter thickness may increase the size of the filter system, potentially limiting the wearer's mobility in confined areas.

What is needed are filters for use in respirators and other articles that are able to meet the NIOSH P-series oily-mist removal efficiency requirements while also providing reduced pressure-drop.

SUMMARY OF THE INVENTION

The present invention can provide an oily-mist resistant filter that has a nondecreasing removal efficiency in combination with a reduced pressure-drop. The filter can offer improved wearer comfort when used in non-powered air-purifying respirators.

The filters of the invention offer these advantages by providing a new electret filter that comprises a fluid permeable first electret filter layer that exhibits nondecreasing removal efficiency at completion of the DOP Penetration/Loading Test and removes a majority of a challenge aerosol collected by the filter during the DOP Penetration/Loading Test. The electret filter also comprises a fluid permeable second electret filter layer that exhibits decreasing removal efficiency at completion of the DOP Penetration/Loading Test. The second electret filter layer also exhibits an initial quality factor that is greater than an initial quality factor of the first electret filter layer as determined using the DOP Penetration/Loading Test. The second electret filter layer is located downstream to the first layer when viewed in the direction of the fluid flow. Both the first and second filter layers include fibers that contain polymeric materials.

The present invention differs from known filters by providing a first layer, which has a nondecreasing removal efficient and an ability to remove a majority of the challenge aerosol, upstream to a second layer that has a decreasing removal efficiency and an initial quality factor greater than the first layer. This new combination of filter layers can allow the filter as a whole to exhibit a nondecreasing removal efficiency at the completion of the DOP Penetration/Loading Test. This performance feature can enable the filter to satisfy the NIOSH P-Series standard for oil-based liquid particulates. Filters of the invention also can be capable of providing a relatively low pressure drop. The invention thus is beneficial for respirators in that it can provide a very safe breathing environment to the user in an oily-mist environment; while at the same time providing good comfort to the wearer by virtue of a low pressure drop.

Glossary

In reference to the invention, the following terms are defined as set forth below. Other terms may also be defined with reference to the specification, claims, and drawings.

"Aerosol" means a gas that contains suspended particles in solid or liquid form;

"basis weight" means the weight of the material or materials in a layer per unit surface area of the major surfaces of the layer;

"decreasing removal efficiency" means that the filter or filter layer exhibits decreasing removal efficiency as indicated by a positive slope in the DOP Percent Penetration curve at completion of the DOP Penetration/Loading Test described in the test section below (where completion occurs at a total exposure of 200±5 milligrams DOP);

"efficiency" means the amount, expressed in percent, of a challenge aerosol removed by a filter, which can be determined based on percent penetration where efficiency(%)=100−penetration(%)

(for example, a filter exhibiting a penetration of 5% would have a corresponding efficiency of 95%);

"electric charge" means that there is charge separation.

"electret filter" or "electret filter layer" means a filter or filter layer that exhibits at least quasi-permanent electrical charge, where "quasi-permanent" means that the electric charge resides in the web under standard atmospheric conditions (22° C., 101,300 Pascals atmospheric pressure, and 50% humidity) for a time period long enough to be significantly measurable;

"first layer" means the layer of the filter that is encountered by an airstream before the second layer;

"fluid permeable" means that the filter or filter layer permits the passage of at least a portion of a fluid;

"layer" means a portion of a filter that has two major surfaces and a thickness between the major surfaces, the layer may extend for an indefinite distance along the major surfaces or it may have defined boundaries;

"majority" means more than 50%;

"melting temperature" is determined by differential scanning calorimetry (DSC) conducted at a heating rate of 10° C./min, and defined as the peak maximum caused by melting that is observed in the second DSC heating cycle (i.e. the peak observed after heating to above the melting temperature, cooling to freeze the article and reheating);

"nondecreasing efficiency" and "nondecreasing removal efficiency" mean that the filter or filter layer exhibits non-decreasing removal efficiency as indicated by a non-positive slope in the DOP Percent Penetration curve at completion of the DOP Penetration/Loading Test described in the test section below (where completion occurs at a total exposure of 200±5 milligrams DOP);

"oily-mist performance-enhancing additive" means an additive that, when provided as part of the filter, improves the ability of the filter to capture oily-mist particles;

"polymer" means a macromolecule made from monomers and includes homopolymers, copolymers, and polymer blends;

"polymeric material" means material that includes at least one polymer and possibly other ingredients in addition to a polymer;

"pressure-drop" means a reduction in static pressure within an airstream between the upstream and downstream sides of a filter through which the airstream passes;

"respirator" means a system or device worn over a person's breathing passages to prevent contaminants from entering the wearer's respiratory tract and/or protect other persons or things from exposure to pathogens or other contaminants expelled by the wearer during respiration, including, but not limited to filtering face masks; and "second layer" means the filter layer that is encountered by the airstream after passing through the first layer.

DETAILED DESCRIPTION OF PREFERRED EMBODIMENTS OF THE INVENTION

Filters of the invention include at least two fluid permeable electret filter layers that, when combined, provide nondecreasing removal efficiency at completion of a DOP Penetration/Loading Test described below. The combined filters can provide nondecreasing removal efficiency and a relatively low pressure-drop. By combining nondecreasing oily-mist removal efficiency with a reduced pressure-drop, the filters of the invention can offer improved user comfort when the filters are used in, for example, non-powered respirators and other devices.

Electret filter layers used in the present invention exhibit a quasi-permanent electric charge. Preferably, the layers each exhibit a "persistent" electric charge, which means that the electric charge resides in the fibers and hence the fibrous web or filter for at least the commonly accepted useful life of the product in which the electret web is employed. The time constant characteristics for decay of the charge preferably are much longer than the time period over which the electret filter or electret filter layer is used.

Although in many instances, filters of the present invention are characterized based on test procedures modeled on the NIOSH P-series standards, filters that meet the criteria described in this document may also be useful in meeting a variety of other standards. For example, the filters of the present invention may also meet tests and standards developed by other governmental and/or non-governmental organizations both inside and outside of the United States.

Figure 1:
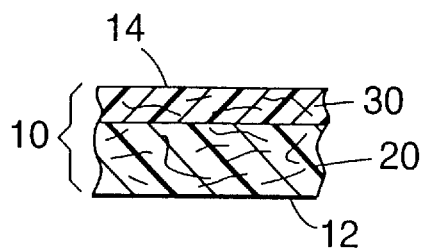
FIG. 1 is a cross-sectional view of one electret filter media 10 of the present invention.

FIG. 1 illustrates a cross-section of a filter 10 that has a first major surface 12 on one side and a second major surface 14 on the opposite side. The filter 10 includes a first electret filter layer 20 and a second electret filter layer 30, both of which are preferably contiguous with each other over the major surfaces of the filter 10.

Although each layer in the filter 10 is depicted as homogeneous, the first and second electret filter layers 20, 30 may or may not be so configured. The layers may, for example, include two or more components as discussed below. In addition, each of the layers may include two or more sub-layers that combine to provide one of the first electret filter layer 20 or second electret filter layer 30. Further, the boundary between the first electret filter layer 20 and the second electret filter layer 30 may be well defined where, for example, the first electret filter layer 20 and second electret filter layer 30 are combined after each is independently produced. Alternatively, the boundary between the first electret filter layer 20 and the second electret filter layer 30 may be less well defined where, for example, one of the layers is manufactured by collecting meltblown fibers on the other layer.

As used in connection with filter 10, the terms "first" and "second" layers are used to denote the sequential order of the layers 20 and 30 in the direction of airflow through the filter 10. Performance of the filter 10 in response to oily-mist challenges will vary, based on the order in which the first electret filter layer 20 and second electret filter layer 30 are presented to the airflow. The first electret filter layer 20 must be encountered by the airstream before the second electret filter layer 30 to obtain the desired combination of removal efficiency and pressure-drop.

The first electret filter layer 20 and second electret filter layer 30 can be attached to each other to form the filter 10 by any suitable technique. Examples of suitable attachment techniques include, but are not limited to, mechanical entanglement, fiber-to-fiber welding, and adhesive bonding.

Further, although not illustrated, the filter 10 may include one or more additional layers located on either side of the filter 10 and/or interposed between the first electret filter layer 20 and second electret filter layer 30. Examples of some potential additional layers include carbon webs, scrims, etc. In another variation, the filter 10 may include a first electret filter layer 20 spaced from the second electret filter layer 30 by air. One example of such a construction is a cartridge filter assembly. As discussed above, the important parameter is that the airstream to be filtered passes through the first electret filter layer 20 before passing through the second electret filter layer 30.

Both the first electret filter layer 20 and second electret filter layer 30 can be provided in the form of electrostatically-charged fibrous polymeric webs. Because the filter 10 is to be used in an oily-mist environment, one or both of the layers may also include a fluorochemical, performance-enhancing additive to improve oily-aerosol filtering ability.

The first electret filter layer 20 includes fibers that contain a first polymeric material, and the second electret filter layer 30 includes fibers that contain a second polymeric material. The first and second polymeric materials may be the same or different. Preferably, however, the first and second polymeric materials are compatible with the techniques used to attach the first electret filter layer 20 and second electret filter layer 30 together to form the filter media 10. More detailed discussions of suitable polymers and polymeric materials useful in the first and second electret filter layers 20, 30 are provided below. The first electret filter layer 20 may also contain a first performance-enhancing additive, and the second electret filter layer 30 may also include a second performance-enhancing additive. The first and second performance-enhancing additives may be the same or different.

The polymeric materials used in the first electret filter layer 20 and second electret filter layer 30 are preferably substantially free of materials such as antistatic agents that could increase electrical conductivity or otherwise interfere with the ability of the polymeric materials to accept and hold electrostatic charge. Additionally, the first electret filter layer 20 and second electret filter layer 30 preferably are not subjected to unnecessary or potentially harmful treatments, which may include exposure to gamma rays, UV irradiation, pyrolysis, oxidation, etc., and which might increase electrical conductivity of material in the first electret filter layer 20 and second electret filter layer 30. Thus, in a preferred embodiment the electret filter 10 is made and used without being exposed to gamma irradiation or other ionizing irradiation.

The first electret filter layer 20 and the second electret filter layer 30 in filters 10 of the present invention can be characterized in a variety of ways. Central to the performance of the filter 10, however, is the relative filtering performance of the layers. The first electret filter layer 20 generally dictates the shape of the loading curve for the filter 10 as a whole and will also remove a majority of the challenge aerosol collected from the airstream by the filter 10. As a result, the first electret filter layer's nondecreasing removal efficiency curve preferably dominates the removal efficiency curve for the filter 10 as a whole.

While the first electret filter layer 20 exhibits a nondecreasing removal efficiency curve, the second electret filter layer 30 exhibits decreasing removal efficiency when tested according to the DOP Penetration/Loading Test. The decreasing removal efficiency of the second electret filter layer 30 goes against the desired nondecreasing removal efficiency of the filter 10 as a whole.

The second electret filter layer 30 exhibits an initial quality factor that is greater that the initial quality factor of the first electret filter layer 20. The quality factor of a filter or a filter layer is a measure of the filter's performance based on penetration and pressure-drop. The initial quality factor (QF) of a filter is calculated according to the following equation:

$$QF = (-\ln(DOP\% \text{ Penetration}/100))/\text{Pressure-drop}$$

where the DOP % Penetration is the initial penetration as determined in the DOP Loading/Penetration Test described below and the pressure-drop is measured in millimeters of $H_2O$ according to the Pressure-Drop Test described below. Generally, a higher initial quality factor indicates better initial filtration performance as compared to a filter that has a lower initial quality factor.

While the first electret filter layer 20 removes a majority of the challenge aerosol collected by the filter 10, the second electret filter layer 30, with its higher quality factor, preferably removes a significant portion of the challenge aerosol that passes through the first electret filter layer 20 while not significantly increasing pressure-drop across the filter 10 as a whole.

The synergy between the first electret filter layer 20 and the second electret filter layer 30 is such that overall filter performance (as determined, for example, by the NIOSH P-series loading tests) is improved as compared to the performance that could be achieved using one or two first electret filter layers 20 alone or one or two second electret filter layers 30 alone. Further, the order of the layers is also important in that reversing the order of the layers will result in decreased filtration performance as compared to a filter in which the airstream encounters the second electret filter layer 30 after the first electret filter layer 20.

In addition to the first and second electret filter layers, other electret filter materials that may be suitable for use in connection with the invention include, but are not limited to, the webs described in U.S. Pat. Nos. Re. 30,782 and Re. 32,171 and 4,798,850. The fibrous webs used in FILTRETE filters marketed by Minnesota Mining and Manufacturing Company, St. Paul, Minn. and the webs used in TECHNOSTAT filters, marketed by All Felt, Inc., Ingleside, Ill. may be suitable for use in the present invention. When tested for performance, the quality factors of these webs measured 3.7 and 3.5, respectively. The TECHNOSTAT filter layers include a scrim.

The first electret filter layer 20 exhibits the two characteristics of (a) removing a majority of the challenge aerosol (DOP) collected by the filter as a whole from the airstream; and (b) nondecreasing removal efficiency. The second electret filter layer 30 can be characterized as exhibiting decreasing removal efficiency and having an initial quality factor that is greater than the initial quality factor of the first electret filter layer 20. The initial quality factor of the second electret filter layer 30 preferably is at least about 0.5 or greater, more preferably at least about 0.6 or greater, still more preferably about 0.8 or greater, and even more preferably about 1.0 or greater (where the initial quality factor is determined based on the results of the DOP Penetration/Loading Test).

In addition to the parameters described above, the first electret filter layer 20 and second electret filter layer 30 in filters 10 of the present invention can be characterized using relative basis weights of the two different layers. This manner of characterizing the inventive filters may be particularly useful where the filter layers are meltblown fibrous polymeric webs. The first electret filter layer 20 in such a filter 10 may preferably have a basis weight that is greater than the basis weight of the second electret filter layer 30. More preferably, the ratio of the basis weight of the first electret filter layer 20 to the basis weight of the second electret filter layer 30 may be about 1.25:1 or greater, and even more preferably, the ratio may be about 1.5:1 or greater.

The first and second filter layers can contain meltblown fibers. Meltblown fibers can be made according to the technique described in Van A. Wente, *Superfine Thermoplastic Fibers,* 48 Indus. Engn. Chem., 1342–46 (1956), and in Report No. 4364 of the Naval Research Laboratories, published May 25, 1954 entitled *Manufacture of Super Fine Organic Fibers* by Van A. Wente et al. Other fibers that may be suitable include spun-bonded fibers. Preferably, the fibers are microfibers, which are fibers that have an effective fiber diameter of about 30 micrometers ($\mu$m) or less. For filtering applications, the fibers preferably are microfibers that have an effective fiber diameter less than 20 $\mu$m, and more preferably about 1 to about 10 $\mu$m, as calculated according to the method set forth in Davies, C. N., *The Separation of Airborne Dust and Particles,* Institution of Mechanical Engineers, London, Proceedings 1B (1952), particularly equation number 12. The first electret filter layer and second electret filter layer preferably have a combined total basis weight of about 30 to 500 grams per meter squared (g/m$^2$), more preferably about 50 to 250 g/m$^2$, and even more preferably about 100 to 200 g/m$^2$. Filters that are too light or too thin may be too fragile or have insufficient filtering ability. For many applications the combined thickness of the first electret filter layer and the second electret filter layer is about 0.5 to 15 millimeters (mm) thick, and commonly about 1 to 5 mm thick. Electret filters of these basis weights and thicknesses may be particularly useful in, for example, a respirator.

In terms of pressure-drop, it may be preferred that filters of the present invention exhibit a pressure-drop (as measured according to the Pressure-Drop Test) of about 12 mm H$_2$O or less, more preferably about 10 mm H$_2$O or less, and even more preferably about 8 mm H$_2$O or less.

When the filters of the invention are used in respirators, they may be specially shaped or housed, for example, in the form of molded or folded half-face masks, filter elements for replaceable cartridges or canisters, or prefilters.

Figure 2:
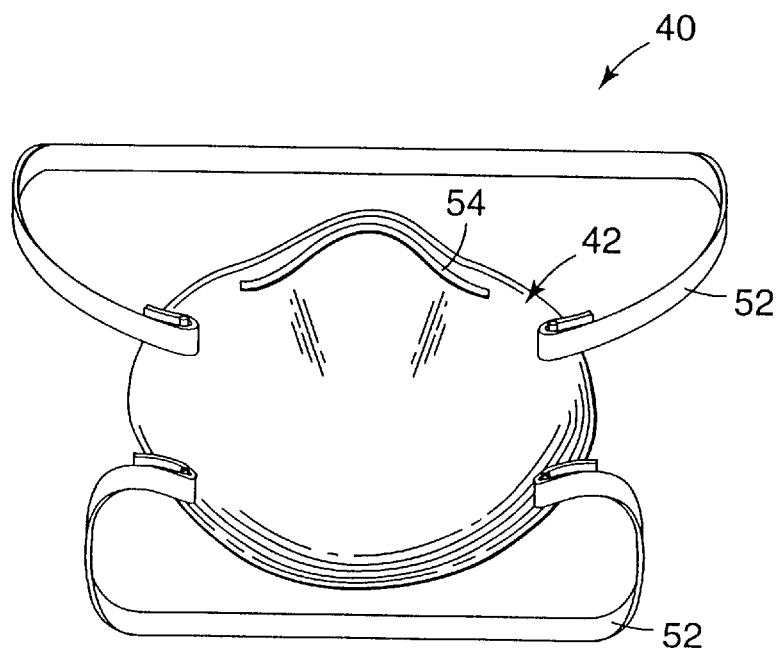
FIG. 2 is a front view of a filtering face mask 40 that contains an electret filter media of the present invention.
Figure 3:
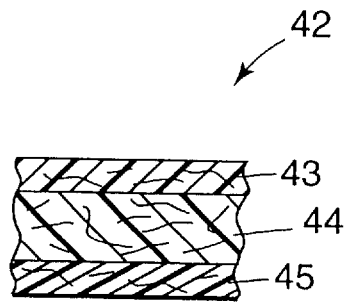
FIG. 3 is an enlarged partial cross-sectional view of the mask body 42 of the mask 40 shown in FIG. 2.

An example of one respirator in the form of a filtering face mask 40 is shown in FIGS. 2 and 3. The mask body 42 can be of curved, hemispherical shape or may take on other shapes as desired (see, e.g., U.S. Pat. Nos. 5,307,796 and 4,827,924). In mask 40, the electret filter media 44 is sandwiched between cover web 43 and inner shaping layer 45. Shaping layer 45 provides structure to the mask body 42 and support for filter media 44.

Shaping layer 45 may be located on either side of the filter media 44 and can be made, for example, from a nonwoven web of thermally-bondable fibers molded into a cup-shaped configuration. The shaping layer can be molded in accordance with known procedures (see, for example, U.S. Pat. No. 5,307,796). The shaping layer or layers typically are made of bicomponent fibers that have a core of a high melting material, such as polyethylene terephthalate, surrounded by a sheath of lower melting material so that when heated in a mold, the shaping layer conforms to the shape of the mold and retains this shape when cooled to room temperature. When pressed together with another layer, such as the filter layer, the low melting sheath material can also serve to bond the layers together.

To hold the mask 40 snugly on the wearer's face, mask body 42 can have straps 52, tie strings, a mask harness, etc. attached thereto. A pliable soft band 54 of metal, such as aluminum, can be provided on mask body 42 to allow it to be shaped to hold the mask 40 in a desired fitting relationship on the nose of the wearer (see, e.g., U.S. Pat. No. 5,558,089). Respirators of the present invention may also include additional layers, valves (see, e.g., U.S. Pat. No. 5,509,436), molded face pieces, etc. Examples of respirators that can incorporate the improved electret filter media of the present invention include those described in U.S. Pat. Nos. 4,536,440, 4,827,924, 5,325,892, 4,807,619 4,886,058 and U.S. patent application Ser. No. 08/079,234.

The construction of some preferred first electret filter layers 20 and second electret filter layers 30 used in filters 10 of the present invention are described separately in more detail below. The preferred electret filter layers do, however, exhibit some common characteristics.

Polymers, which may be suitable for use in producing fibers that are useful in this invention, include thermoplastic organic nonconductive polymers. The polymers can be synthetically produced organic macromolecules that consist essentially of recurring long-chain structural units made from a large number of monomers. The polymers used should be capable of retaining a high quantity of trapped charge and should be capable of being processed into fibers, such as through a melt-blowing apparatus or a spun-bonding apparatus. The term "organic" means the backbone of the polymer includes carbon atoms. The term "thermoplastic" refers to a polymer or polymeric material that softens when exposed to heat. The term "nonconductive" means having a volume resistivity of greater than about $10^{14}$ ohm.cm, more preferably greater than about $10^{16}$ ohm.cm, at room temperature (22° C.). The polymers preferably have the capability of possessing a non-transitory or long-lived trapped charge. As reported by Klaase et al. in U.S. Pat. No. 4,588,537, useful polymers may include polypropylene, poly(4-methyl-1-pentene), linear low density polyethylene, polystyrene, polycarbonate, polyester, and combinations of these polymers. The major component of each of the polymers is preferably polypropylene because of polypropylene's high resistivity, its ability to form meltblown fibers that have diameters useful for air filtration, and its satisfactory charge stability, hydrophobicity, and resistance to humidity. On the other hand, polypropylene typically is not oleophobic. The polymeric materials may contain about 90 to 99.8 weight percent polymer; alternatively about 95 to 99.5 weight percent; and in another alternative about 98 to 99 weight percent polymer.

Performance-enhancing additives are those additives that enhance the oily aerosol filtering ability of a filter as measured by the DOP Penetration/Loading Test described in the Test Methods section. Particular performance-enhancing additives may include those described by Jones et al. in U.S. Pat. No. 5,472,481 and by Rousseau et al. in U.S. Pat. No. 5,908,598. The performance-enhancing additives may include fluorochemical additives such as fluorochemical oxazolidinones as those described in U.S. Pat. No. 5,025,052 to Crater et al., fluorochemical piperazines, and stearate esters of perfluoroalcohols.

In view of their demonstrated efficacy in improving filtering properties of polymeric electret filters, the performance-enhancing additive preferably is a fluorochemical, more preferably a fluorochemical oxazolidinone. Preferably, the fluorochemical has a melting point above the melting point of the polymeric materials and below the extrusion temperature at which the fibers containing the polymeric materials are manufactured. For processing considerations that involve use of polypropylene, the fluorochemicals preferably have a melting point above about 160° C., and more preferably a melting point of about 160° C. to 290° C. Particularly preferred fluorochemical additives include Additives A, B, and C disclosed in U.S. Pat. No. 5,411,576 to Jones et al.

The polymers and performance-enhancing additives in the polymeric materials can be blended as solids before melting them, but the components are preferably melted separately and blended together as liquids. Alternatively, the performance-enhancing additive and a portion of the polymer can be mixed as solids and melted to form a relatively additive-rich molten blend that is subsequently combined with an additive-free polymer to achieve the desired proportions of the two components in the polymeric materials.

The molten blend can then be shaped into a desired form such as a film or fiber. Typically the molten blend is shaped by extruding through a die, but in other methods the blend can be shaped by alternative processes such as drawing in an electrostatic field (see, for example, Y. Trouilhet, "New Method of Manufacturing Nonwovens By Electrostatic Laying," in Index 81 Congress Papers, Advances In Web Forming, European Disposables And Nonwovens Association, Amsterdam, May 5–7, 1981.). One illustrative extrusion process uses two extruders and about 10 to about 20 weight percent additive and about 80 to about 90 weight percent polymer are blended in a first extruder. This relatively high additive-content molten blend is fed into a second extruder with molten polymer (not containing an additive) to form a blend that is extruded through a die orifice. The high additive-content molten blend is preferably combined with the additive-free polymer just before extruding the molten material through a die.

This two-extruder process can reduce the time that the performance-enhancing additive is exposed to high temperature. The temperature during extrusion preferably is controlled to provide desired extrudate rheology and avoid thermal degradation of the performance-enhancing additive. Different extruders typically require different temperature profiles, and some experimentation may be required to optimize extrusion conditions for a particular system. For the preferred polypropylene/fluorochemical blends, the temperature during extrusion is preferably maintained below about 290° C. to reduce thermal degradation of the fluorochemical performance-enhancing additive. If extruders are used, they are preferably of the twin screw type for better mixing. Suitable extruders may be obtained from, for example, companies such as Werner & Pfleiderer or Berstorff. The molten blend is preferably extruded through a die, and more preferably the blend is extruded through a die under melt-blowing conditions.

The polymeric fibers used in preferred first and second electret filter layers can be of a sheath-core configuration and, if so, the sheath should contain the performance-enhancing additive as described in the blends discussed above. Additives also may be placed on the web after its formation by, for example, using the surface fluorination technique described in U.S. patent application Ser. No. 09/109,497, filed Jul. 2, 1998 by Jones et al.

The first and second electret filter layers in the filters of the present invention each may be in the form of a multitude of electret fibers that are formed into a self-supporting electret filter layer. Alternatively, the layers can take the form of a web that contains at least some electret fibers combined with a supporting structure. For many filtration applications, the electret web is in the form of a nonwoven web that has the fibers randomly entangled as a self-supporting mass. Webs that contain meltblown microfibers are typically in this form. The electret filter layers can be combined with some non-electret material. For example, the supporting structure can be non-electret fibers or supporting non-electret, nonwoven webs. In a preferred embodiment, the first and second layers both comprise a nonwoven web that comprises electrically-charged, meltblown microfibers.

The first and second layers may also include staple fibers to provide a loftier, less dense web. Methods of incorporating staple fibers in the nonwoven web can be carried out as described in U.S. Pat. No. 4,118,531 to Hauser. If staple fibers are used, the web preferably contains less than 90 weight percent staple fibers, more preferably less than 70 weight percent. For reasons of simplicity and optimizing performance, the layers may, in some embodiments, consist essentially of meltblown fibers that may or may not include performance enhancing additives.

The first and second layers may also contain one or more active particulate materials such as sorbent particulates, for example, alumina and activated carbon. U.S. Pat. No. 5,696,199 to Senkus et al. discloses active particulate that may be suitable for use in connection with the present invention. The particulate may be added to one or both of the layers or between the layers to assist in removing gaseous contaminants from an airstream passing through the filter. Particulate loaded webs are described, for example, in U.S. Pat. No. 3,971,373 to Braun, U.S. Pat. No. 4,100,324 to Anderson and U.S. Pat. No. 4,429,001 to Kolpin et al. If particulate material is loaded into one or both of the layers, each layer preferably contains less than 80 volume percent particulate material, more preferably less than 60 volume percent. In embodiments where the electret filter does not need to remove gaseous contaminants, the filter may not include any sorbent particulate.

Electret filters of the present invention may find use in numerous filtration applications, including respirators, home and industrial air-conditioners, furnaces, air cleaners, vacuum cleaners, medical and air line filters, and air cleaning systems in vehicles and in electronic equipment such as computers and disk drives.

First Electret Filter Layer

A first electret filter layer that may be suitable for use in a filter of the invention is described in International Patent Publication WO 99/16532, entitled *Electret Articles And Filters With Oily Mist Resistance*. The filter webs described in that document generally exhibit one or more desirable properties that enhance the webs' ability to remove oily-mists from an airstream. One of those desirable properties is the low crystallinity of the polymeric fibers in the web that, when combined with a performance-enhancing additive, enhances the web's oily-mist filtering performance.

One method of manufacturing low crystallinity polymeric fibers uses quenching to reduce the polymeric material's order or crystallinity as compared to the polymeric material's order without the quenching process. The quenching step occurs concurrently with or shortly after converting a molten material into a desired shape. Usually the fiber-forming material is shaped by being extruded through a die orifice and is quenched, typically by applying a cooling fluid to the extrudate, after it exits the orifice.

The polymeric material in the fibers of the first electret filter layer preferably contains an oily-aerosol performance-enhancing additive as discussed above. The polymeric materials in the first electret filter layer may preferably include about 0.2 to 10 weight percent of a first performance-enhancing additive, more preferably about 0.2 to 5.0 weight percent, and most preferably about 1.0 to 2.0 weight percent.

Where the first electret filter layer is a web of meltblown polymeric fibers, the first electret filter layer typically has a total basis weight of about 20 to about 300 grams per meter squared ($g/m^2$), more preferably about 30 to about 150 $g/m^2$. If the first electret filter layer web is too dense it may be difficult to charge; while first electret filter layer webs that are too light or too thin may be fragile or have insufficient filtering ability. For many applications, the first electret filter layer may be about 0.3 to about 10 millimeters (mm) thick, and is commonly about 0.5 to about 3 mm thick.

In general, melt-blowing of the polymer material to form fibers for the first electret filter layer in the present invention is conducted using conventional procedures, with the modification that the extruded material is preferably quenched or cooled as it exits the die to minimize the polymer crystallization in the resulting fibers. Suitable quenching techniques may include water spraying, spraying with a volatile liquid, or contacting with chilled air or cryogenic gases such as carbon dioxide or nitrogen. Typically the cooling fluid (liquid or gas) is sprayed from nozzles located within about 5 centimeters (cm) of the die orifices. In the case of materials extruded through a die, the cooling fluid preferably impacts the molten extrudate before collection, more preferably immediately after extrusion from the die. For example, in the case of meltblown fibers, the molten extrudate is preferably quenched before being collected in the form of a nonwoven web. The cooling fluid is preferably water. The water can be tap water, but is preferably distilled or deionized water.

Electret filters made from quenched polymeric materials exhibit unexpectedly good oily-liquid-aerosol-filtration performance when subsequently annealed and charged. The quenching step reduces the polymeric material's crystalline content as compared to unquenched polymeric material extruded under the same conditions. The quenched polymeric material preferably has a low degree of crystallinity as determined by x-ray diffraction.

After quenching, the fibers in the first electret filter layer are preferably collected to form a nonwoven web. Meltblown fibers typically can be collected as a nonwoven web on a rotating drum or moving belt. Preferably the quenching and collection steps are conducted such that there is no excess quenching fluid (if there is a residual fluid, it is typically water) remaining on the collected material. Fluid remaining on the collected material may cause problems with storage and may require additional heating during annealing to drive off the quenching fluid. Thus, the collected material preferably contains less than 1 weight percent quenching fluid, and more preferably contains no residual quenching fluid. The collector may include a web transport mechanism that moves the collected web toward a drying mechanism as the fibers are collected. In a preferred process, the collector moves continuously about an endless path so that the webs can be manufactured continuously. The collector may be in the form of, for example, a drum, belt, or screen. Essentially, any apparatus or operation suitable for collecting the fiber is contemplated for use in connection with the present invention. An example of a collector that may be suitable is described in U.S. patent application Ser. No. 09/181,205 entitled *Uniform Meltblown Fibrous Web And Method And Apparatus For Manufacturing*.

The quenched polymeric material can be annealed to increase its electrostatic charge stability in the presence of oily-mists. Preferably, the performance-enhancing additive is a substance that presents low energy surfaces such as a fluorochemical, and the annealing step is conducted at a sufficient temperature and for a sufficient time to cause the additive to diffuse to the interfaces (for example, the polymer-air interface, and the boundary between crystalline and amorphous phases) of the polymeric material. Generally, higher annealing temperatures allow shorter annealing times. To obtain desirable properties for the final product, annealing of polymeric materials that contain polypropylene should be conducted above about 100° C. Preferably, the annealing of a polypropylene containing polymeric material is conducted at about 130 to 155° C. for about 2 to 20 minutes; more preferably from about 140 to 150° C. for about 2 to 10 minutes; and still more preferably about 150° C. for about 4 to 5 minutes. Annealing is preferably conducted under conditions that do not substantially degrade the structure of the web. For polypropylene webs, annealing temperatures substantially above about 155° C. may be undesirable because the web structure may be damaged.

The polymeric material of the first electret filter layer is preferably electrostatically-charged after it has been quenched and annealed. Examples of electrostatic charging methods useful in the invention may include those described in U.S. Pat. No. 5,401,446 to Tsai, et al., U.S. Pat. No. 4,375,718 to Wadsworth et al., U.S. Pat. No. 4,588,537 to Klaase et al., and U.S. Pat. No. 4,592,815 to Nakao. The polymeric materials may also be hydrocharged—see U.S. Pat. No. 5,496,507 to Angadjivand et al. Cut fibers can be tribocharged by rubbing or by shaking with dissimilar fibers—see U.S. Pat. No. 4,798,850 to Brown et al. Preferably, the charging process involves subjecting the material to a corona discharge or to a pulsed high voltage.

Electret filter webs used for the first layers in filters of the invention can be characterized by Thermally Stimulated Discharge Current (TSDC) studies. Charged articles can be tested directly by placing a sample between two electrodes and heating the sample at a constant rate. Current discharged from the sample is measured by an ammeter. The current discharged from the sample is a function of the polarizability and charge trapping of the article being tested.

Alternatively, charged articles can be first poled in an electric field at an elevated temperature and then rapidly cooled below the glass transition temperature ($T_g$) of the polymer while holding the polarizing field on to "freeze in" the induced polarization. The sample is then heated at a constant rate and the resulting discharged current is measured. In the polarization process, dipole alignment, charge redistribution, or some combination of these may occur.

During TSDC studies, charges stored in an electret become mobile and are neutralized either at the electrodes or in the bulk sample by recombining with charges of opposite sign. This generates an external current that shows a number of peaks when recorded as a function of temperature and plotted on a graph (termed a TSDC spectrum). The shape and location of these peaks depends on charge trapping energy levels and physical location of trapping sites.

Electret charges are usually stored in structural anomalies, such as impurities, defects of the monomeric units, chain irregularities, etc. The width of a TSDC peak is influenced by the distribution of charge trapping levels in the electrets. In semicrystalline polymers, charges often accumulate or deplete near the amorphous-crystalline interfaces due to the difference in phase conductivity (the Maxwell-Wagner effect). These trapping sites are usually associated with different trapping energies, where a continuous distribution of activation energies will be expected and the TSDC peaks expected to overlap and merge into a broad peak.

As discussed in WO 99/16532, various features in the TSDC spectrum correlate with superior oily-mist loading performance. The TSDC spectral features correlating with superior filtration performance for the first electret filter layer material include the features discussed below.

In one embodiment, an electret filter or filter layer is produced that has a TSDC spectrum exhibiting a peak at about 15° C. to 30° C., more preferably about 15° C. to 25° C., below the melting temperature of the sample, as measured by TSDC Test Procedure 1. When the polymer in the polymeric material of the sample is polypropylene, the TSDC spectrum exhibits a peak at about 130 to about 140° C.

In another embodiment, an electret filter or filter layer is produced that has a peak in the TSDC spectrum with a width at half height of less than about 30° C., more preferably a width at half height of less than about 25° C., and still more preferably a width at half height of less than about 20° C., as measured by TSDC Test Procedure 2. In cases where the polymer in the polymeric material of the sample is polypropylene, the narrow peak described above has its maximum at about 138 to 142° C.

In yet another embodiment, an electret filter or filter layer is produced that exhibits increasing charge density over 1 to 5 minutes, and/or 5 to 10 minutes, of poling time, as measured by TSDC Test Procedure 3.

Second Electret Filter Layer

Preferred second electret filter layers in the filters of the invention may include nonwoven electrostatically charged fibrous polymeric webs that preferably include a second oily-mist performance-enhancing additive.

Charging of the second electret filter layer may preferably be carried out by hydrocharging as discussed in, for example, U.S. Pat. No. 5,496,507 to Angadjivand et al. Hydrocharging is accomplished by impinging jets of water or a stream of water droplets onto the web at a pressure sufficient to provide the web with filtration-enhancing electret charge. The pressure necessary to achieve optimum results may vary depending on the type of sprayer used, the type of polymer from which the web is formed, the thickness and density of the web, and whether pretreatment such as corona charging was carried out before hydrocharging. Generally, pressures in the range of about 10 to 500 psi (69 to 3450 kPa) are suitable. Preferably, the water used to provide the water droplets is relatively pure. Distilled or deionized water is preferable to tap water. The jets of water or stream of water droplets can be provided by any suitable spray means. Those apparatus useful for hydraulically entangling fibers are generally useful in the method of the present invention, although the operation is carried out at lower pressures in hydrocharging than generally used in hydroentangling.

Alternatively, the second electret filter layer can be charged according to the methods discussed in connection with the first electret filter layer.

The polymeric material contained in the fibers of the second electret filter layer preferably includes an oily-aerosol performance-enhancing additive as discussed above. The polymeric material in the second electret filter layer may contain about 0.2 to 10 weight percent of a second performance-enhancing additive; alternatively about 0.5 to 5.0 weight percent; and in another alternative about 0.5 to 1.5 weight percent.

Where the second electret filter layer of the filter media is a web that contains meltblown fibers, the second electret filter layer typically has a total basis weight of about 10 to about 200 grams per square meter ($g/m^2$), more preferably about 20 to about 100 $g/m^2$. If the second electret filter layer web is too dense, it may be difficult to charge; while second electret filter layer webs that are too light or too thin may be fragile or have insufficient filtering ability. For many applications, the second electret filter layer web may be about 0.2 to about 5 millimeters (mm) thick, and commonly about 0.5 to about 2 mm thick.

Test Methods

The following test methods were used to determine the described characteristics of the layers and filter media of the invention.

Web Thickness/Basis Weight

Web thickness was measured according to ASTM D1777-64 using a 230 g weight on a 10 cm diameter disk.

Basis weight was calculated from the weight of a 5.25 in. (13.3 cm) diameter disk.

Pressure-drop Test

Pressure-drop was measured according to ASTM F778. Pressure-drops recited in connection with this invention were measured using a flow rate of 85 liters per minute through a circular filter that had an exposed diameter of 15.2 cm. The face velocity was 7.77 cm/second.

DOP Penetration/Loading Test

The dioctylphthalate (DOP) measurements were performed by monitoring the DOP percent penetration of a controlled DOP aerosol through a sample, as well as the DOP loading in the sample during prolonged exposure to the challenge DOP aerosol.

The measurements were made using an Automated Filter Tester (AFT) model #8110 or #8130 (available from TSI Incorporated, St. Paul, Minn.) adapted for DOP aerosol. The DOP challenge aerosol generated by the 8110 and 8130 AFT instruments was nominally a monodisperse 0.3 micrometers mass median diameter that had an upstream concentration of about 100 milligrams per cubic meter as measured by a standard gravimetric filter. The samples tested were all tested with the aerosol ionizer turned on and with a flow rate through the filter web sample of 85 liters per minute (LPM). The samples were cut into disks that were 6.75 inch (17.15 cm) in diameter. Two of the disks were stacked directly on top of each other, and the disks were mounted in a sample holder such that a 6.0 inch (15.2 cm) diameter circle was exposed to the aerosol. The face velocity during testing was 7.77 centimeters per second (cm/sec). The samples were weighed before inserting them into a sample holder. The tests were considered completed after exposure of 200±5 milligrams DOP based on the NIOSH regulations, although each test was continued until an exposure of at least 600 milligrams of DOP was reached.

The DOP percent penetration is defined as:

$$DOP\% \text{ Penetration}=100(DOP \text{ Conc. Downstream}/DOP \text{ Conc. Upstream})$$

where the ratio of the upstream and downstream concentrations were measured by light scattering. The DOP percent penetration was calculated automatically by the AFT equipment. Typically, an initial DOP percent penetration value was obtained from the first recorded percent penetration in the test, which initial DOP penetration is obtained within the first minute of the test procedure and within the first 10 milligrams of DOP challenge aerosol introduced to the filter sample.

The DOP Percent Penetration and corresponding pressure-drop data were transmitted to an attached computer where they were stored. After test termination, the loaded samples were, in some instances, weighed again to monitor the amount of DOP collected on the fibrous web samples. This served as a cross-check of the DOP exposure extrapolated from the measured DOP concentration incident on the fibrous web and the measured aerosol flow rate through the web.

Thermally Stimulated Discharge Current (TSDC)

The TSDC studies were conducted using a Solomat TSC/RMA model 91000 with a pivot electrode, available from TherMold Partners, L.P., Thermal Analysis Instruments of Stamford, Conn. Web samples were cut and placed between electrodes in the Solomat TSC/RMA. In the Solomat instrument, a thermometer is disposed adjacent to, but not touching, the sample. The web samples should be optically dense: that is, there should not be visible holes through the sample web. The samples should be large enough to completely cover the top contact electrode. Since the electrode is about 7 mm in diameter, the samples were cut larger than 7 mm in diameter. To ensure good electrical contact to the electrodes, the web samples were compressed by about a factor of 10 in thickness. Air was evacuated from the sample chamber and was replaced with helium at a pressure of about 110,000 Pascals. Liquid nitrogen cooling was used.

TSDC Test Procedure 1

The discharge current of an unpoled sample was measured starting from 25° C. and heating rate of 3° C./min. Two samples from the same web were tested identically, except the samples were oriented in opposite directions when placed between the electrodes. The peak position(s) was measured for the sample that was oriented to produce a positive discharge current at a temperature above about 110° C.

The melting temperature of the sample was determined by differential scanning calorimetry (DSC) conducted at a heating rate of 10° C./min, and defined as the peak maximum caused by melting that is observed in the second DSC heating cycle (that is, the peak observed after heating to above the melting temperature, cooling to freeze the sample, and reheating).

TSDC Test Procedure 2

A sample was studied by TSDC Test Procedure 1 to determine the correct orientation of the sample. The sample was then oriented in the Solomat TSC in the direction that produces a positive discharge current in the lower temperature peak of TSDC Test Procedure 1.

Samples are then tested by poling at 100° C. for 1, 5, 10 or 15 minutes in an applied electric field of 2.5 kilovolts per millimeter (kV/mm) in the apparatus described above. With the field on, the sample is rapidly cooled (at the maximum rate of the instrument) to −50° C. The sample is held at −50° C. for 5 minutes with the field off, then heated at 3° C./min while the discharge current is measured. The value of peak width at half height of each peak was calculated by drawing a baseline, based on the curve slope from 0 to about 30° C., and measuring the peak width at half height.

TSDC Test Procedure 3

This procedure is identical to TSDC Test Procedure 2 except that the charge density of the sample at each poling time is calculated by drawing a baseline between the minima on each side of a selected peak. If a minimum did not exist on the high temperature side of a peak, a baseline was drawn between a minimum on the low temperature side of the peak and the point at which the curve crossed or was extrapolated to cross zero current on the high temperature side of the peak. Charge density was calculated by integrating the area under the peak.

EXAMPLES

The following comparative Examples A–D are provided to assist in understanding of the invention.

Comparative Example A

A filter was made using two (2) layers of filter material manufactured in a method similar to that recited in Example 7 of WO 99/16532. The difference between the manufacturing methods in this example and Example 7 of WO 99/16532 was in the water spray quenching. The filter layers for this example were water-spray quenched with a spray bar that included ten nozzles (Air Atomizing Pressure Spray Set-ups #SU14 with Fluid Cap 2850 and Air Cap 73320 from Spraying Systems Co., Wheaton, Ill.). The spray bar was mounted 17.8 cm above the center line of the web and about 2.5 cm downstream of the die tip. Air pressure was set at 20 psi (140 kPa), and the water pressure was set at 35 psi (240 kPa). The flow meters were adjusted such that each nozzle delivered a flat fan of water droplets at a rate of 80 ml of water per minute to the molten polymer streams exiting the die.

Figure 4:
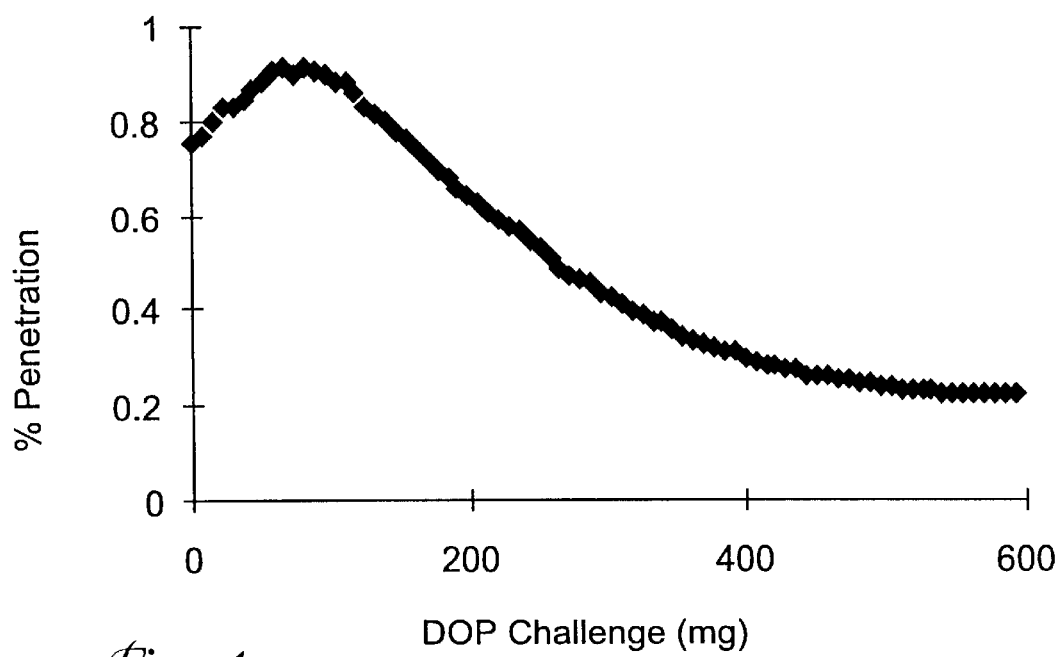
FIG. 4 illustrates the DOP % penetration of the filter construction of Comparative Example A.

Each of the two layers in the filter had a basis weight of 100 grams per square meter (for a total filter basis weight of 200 grams per square meter), a pressure-drop of about 5.5. mm H$_2$O, a thickness of 1.5 mm, and an initial quality factor of 0.45. The filter was tested according to the DOP Penetration/Loading Test described above and the results are graphically depicted in FIG. 4. The filter exhibited nondecreasing removal efficiency at completion of the test (at 200±5 milligrams), as well as out to at least about 600 milligrams DOP. This filter construction met the NIOSH P-series requirements described above.

This filter construction exhibited an initial pressure-drop as measured according to ASTM F778 of 10.9 millimeters H$_2$O.

Comparative Example B

A filter was made using two (2) layers of filter material manufactured according to the layers manufactured for Comparative Example A with the following exceptions. The feed rate to the die was set at 45 kg per hour using Fina 3960 polypropylene resin available from Fina Oil and Chemical Company. Water quenching was not performed. The web was hydrocharged as described in U.S. Pat. No. 5,496,507 by impinging a stream of water droplets on the web at a pressure sufficient to provide the web with a filtration-enhancing electret charge, followed by drying.

Figure 5:
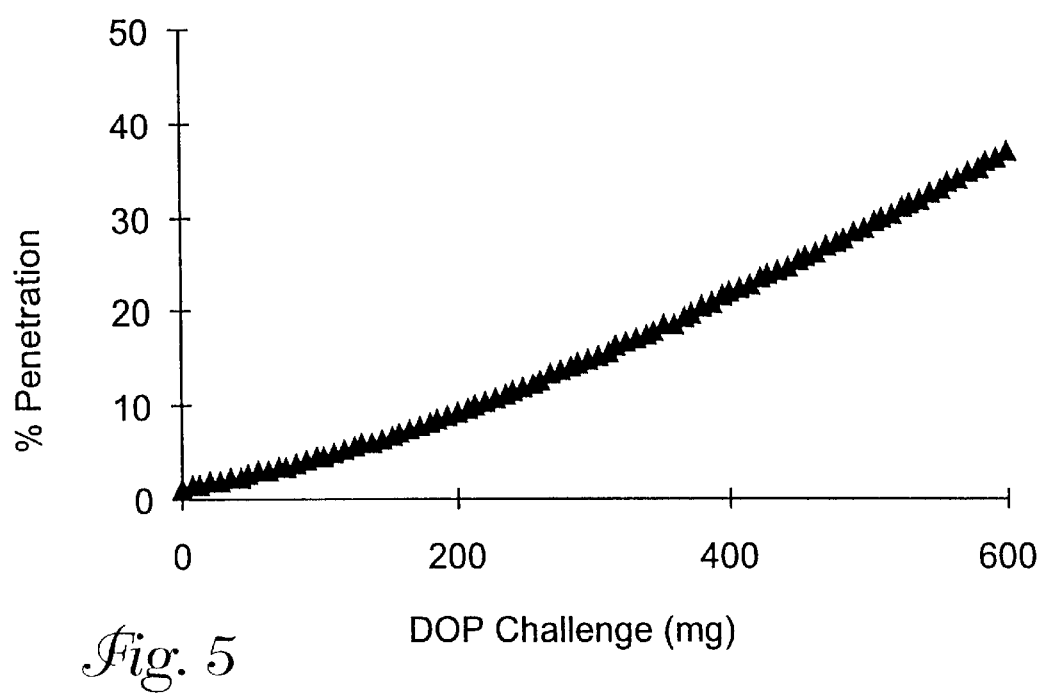
FIG. 5 illustrates the DOP % penetration of the filter construction of Comparative Example B.

Each of the two layers in the filter had a basis weight of 33 grams per square meter (for a total filter basis weight of 66 grams per square meter), a pressure-drop of about 1.7 mm H$_2$O, a thickness of 0.58 mm, and an initial quality factor of 1.6. The filter was tested according to the DOP Penetration/ Loading Test described above and the results are graphically depicted in FIG. 5. The filter exhibited decreasing removal efficiency at completion of the test (at 200±5 milligrams), as well as out to at least about 600 milligrams DOP. As a result, this filter construction did not meet the NIOSH P-series requirements described above.

This filter construction exhibited an initial pressure-drop as measured according to ASTM F778 of 2.8 millimeters H$_2$O.

Comparative Example C

Figure 6:
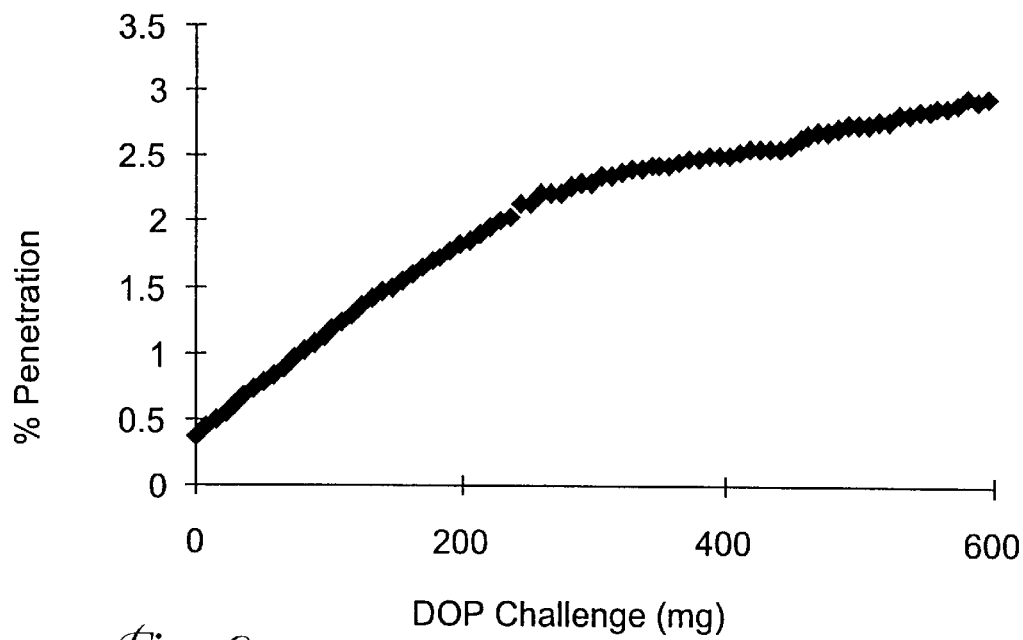
FIG. 6 illustrates the DOP % penetration of the filter construction of Comparative Example C.

A filter was made using two layers of different filter materials. The first layer of filter material had the same construction as one of the layers described above in Comparative Example B. The second layer of filter material had the same construction as one of the layers described above in Comparative Example A. The filter was tested according to the DOP Penetration/Loading Test described above and the test results are graphically depicted in FIG. 6. The filter exhibited decreasing removal efficiency at completion of the test (at 200±5 milligrams), as well as out to at least about 600 milligrams DOP. As a result, this filter construction did not meet the NIOSH P-series requirements described above.

This filter construction exhibited an initial pressure-drop as measured according to ASTM F778 of 7.8 millimeters H$_2$O.

Comparative Example D

A filter was made using two layers of filter material described above in Comparative Example B, except that both of the layers were placed in an oven held at a temperature of 95° C. for 15 hours before testing.

Figure 7:
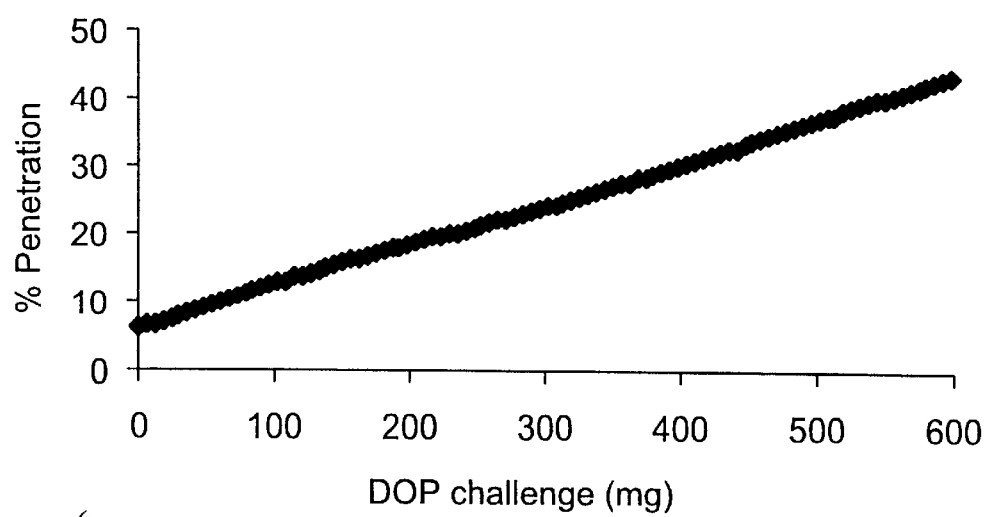
FIG. 7 illustrates the DOP % penetration of the filter construction of Comparative Example D.

Each of the two layers in the filter had a basis weight of 33 g/m$^2$ (for a total basis weight of 66 g/m$^2$) and an initial quality factor of 0.8. The filter was tested according to the DOP Penetration/Loading Test described above and the test results are graphically depicted in FIG. 7. The filter exhibited decreasing removal efficiency at completion of the test (at 200±5 milligrams), as well as out to at least about 600 milligrams DOP. As a result, this filter construction did not meet the NIOSH P-series requirements described above.

This filter construction exhibited an initial pressure-drop as measured according to ASTM F778 of 3.5 millimeters H$_2$O.

The following non-limiting Examples 1 and 2 illustrate some of the advantages of the present invention.

Example 1

A filter was made using two different layers of filter material. The first layer of filter material had the same construction as one of the layers described above in Comparative Example A (with a basis weight of 100 g/m$^2$). The second layer of filter material had the same construction as one of the layers described above in Comparative Example B (with a basis weight of 33 g/m$^2$). The initial quality factor of the first layer was 0.45 and the initial quality factor of the second layer was 1.6, thus satisfying the requirement that the initial quality factor of the second layer be greater than the initial quality factor of the first layer.

Figure 8:
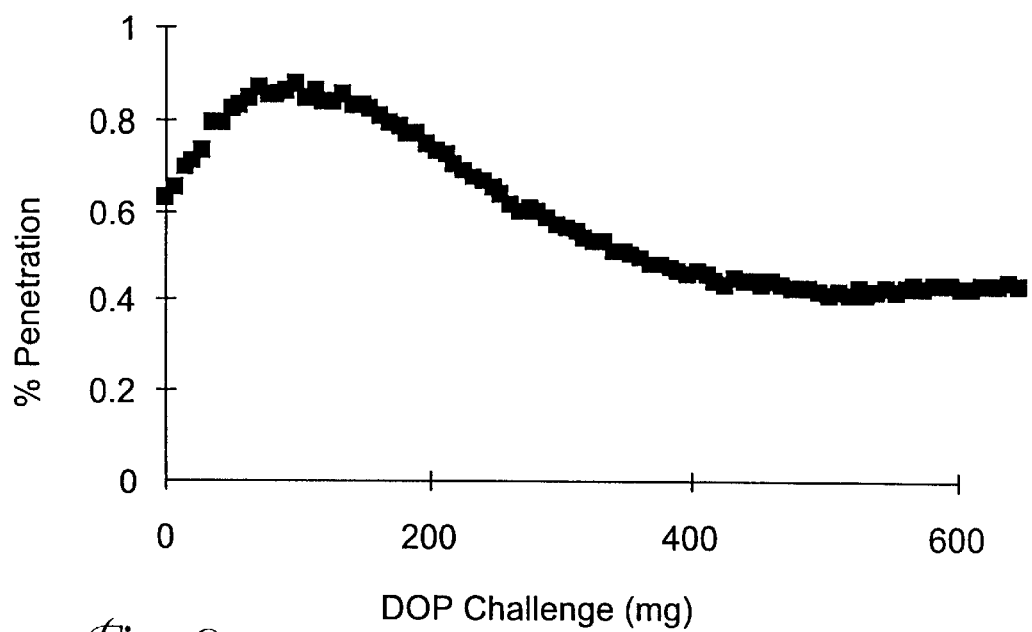
FIG. 8 illustrates the DOP % penetration of the filter construction of Example 1.

The two-layer filter (with a total basis weight of 133 g/m$^2$) was tested according to the DOP Penetration/Loading Test described above and the test results are graphically depicted in FIG. 8. The filter exhibited nondecreasing removal efficiency at completion of the test (at 200±5 milligrams), as well as out to at least about 600 milligrams DOP. This filter construction met the NIOSH P-series requirements described above.

This filter construction exhibited an initial pressure-drop as measured according to ASTM F778 of 7.4 millimeters H$_2$O. In other words, the filter met the NIOSH P-series requirements while exhibiting a pressure-drop that was about 3.5 millimeters H$_2$O lower than the filter of Comparative Example A.

Also illustrated is the criticality in the ordering of layers in filters of the invention. Reversing the order of the first and second filter layers used in this example (as described in Comparative Example C) resulted in a filter that, although exhibiting a relatively low pressure-drop, did not meet the NIOSH P-series requirements. With the two layers in the order recited in this example, however, the filter met the NIOSH P-series requirements while exhibiting a relatively low pressure-drop.

Example 2

A two layer filter was made using a first layer of filter material that had the same construction as one of the layers described above in Comparative Example A (with a basis weight of 100 g/m$^2$). The second layer in the filter had the same construction as one of the layers described above in Comparative Example D (with a basis weight of 33 g/m$^2$). The initial quality factor of the first layer was 0.45 and the initial quality factor of the second layer was 0.8, thus satisfying the requirement that the initial quality factor of the second layer be greater than the initial quality factor of the first layer.

Figure 9:
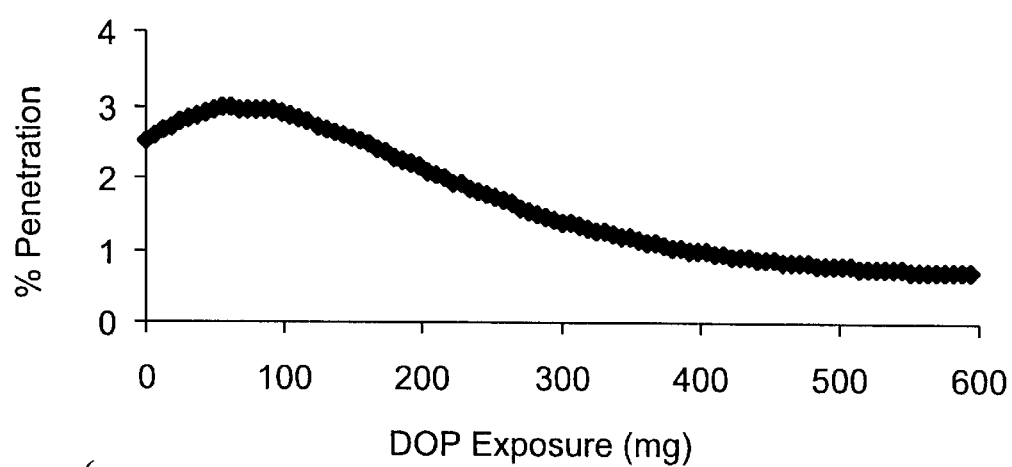
FIG. 9 illustrates the DOP % penetration of the filter construction of Example 2.

The two-layer filter (with a total basis weight of 133 g/m$^2$) was tested according to the DOP Penetration/Loading Test described above and the test results are graphically depicted in FIG. 9. The filter exhibited nondecreasing removal efficiency at completion of the test (at 200±5 milligrams), as well as out to at least about 600 milligrams DOP. This filter construction met the NIOSH P-series requirements described above.

This filter construction exhibited an initial pressure-drop as measured according to ASTM F778 of 6.9 millimeters $H_2O$. In other words, the filter met the NIOSH P-series requirements while exhibiting a pressure-drop that was about 4 millimeters $H_2O$ lower than, e.g., the filter of Comparative Example A.

The preceding specific embodiments are illustrative of the practice of the invention. This invention may be suitably practiced in the absence of any element or item not specifically described in this document. The complete disclosures of all patents, patent applications, and publications are incorporated into this document by reference as if individually incorporated in total.

Various modifications and alterations of this invention will become apparent to those skilled in the art without departing from the scope of this invention, and it should be understood that this invention is not to be unduly limited to illustrative embodiments set forth herein, but is to be controlled by the limitations set forth in the claims and any equivalents to those limitations.

What is claimed is:

1. A filter that comprises:
    a fluid permeable first electret filter layer that comprises fibers that contain a first polymeric material, wherein the first electret filter layer exhibits nondecreasing removal efficiency at completion of the DOP Penetration/Loading Test and removes a majority of a challenge aerosol collected by the filter during the DOP Penetration/Loading Test; and
    a fluid permeable second electret filter layer that comprises fibers that contain a second polymeric material, wherein the second electret filter layer exhibits decreasing removal efficiency at completion of the DOP Penetration/Loading Test, and further wherein the second electret filter layer exhibits an initial quality factor that is greater than an initial quality factor of the first electret filter layer as determined using the DOP Penetration/Loading Test.

2. The filter of claim 1, wherein the first electret filter layer has a thermally stimulated discharge current (TSDC) spectrum exhibiting a peak having a width at half height of less than about 30 degrees Celsius as measured by TSDC Test Procedure 2.

3. The filter of claim 1, wherein the first electret filter layer has a thermally stimulated discharge current (TSDC) spectrum exhibiting a peak having a width at half height of less than about 25 degrees Celsius as measured by TSDC Test Procedure 2.

4. The filter of claim 1, wherein the first electret filter layer has a thermally stimulated discharge current (TSDC) spectrum exhibiting a peak at about 15° C. to 30 ° C. below the melting temperature of the first polymeric material as measured by TSDC Test Procedure 1.

5. The filter of claim 1, wherein the first electret filter layer has a thermally stimulated discharge current (TSDC) spectrum exhibiting a peak at about 15° C. to 25° C. below the melting temperature of the first polymeric material, as measured by TSDC Test Procedure 1.

6. The filter of claim 1, wherein the first polymeric material comprises polypropylene, and further wherein a thermally stimulated discharge current (TSDC) spectrum of the first electret filter layer exhibits a peak at about 130° C. to 140° C.

7. The filter of claim 1, wherein the first electret filter layer exhibits increasing charge density over 1 to 5 minutes of poling time, as measured by TSDC Test Procedure 3.

8. The filter of claim 1, wherein the first electret filter layer exhibits increasing charge density over 5 to 10 minutes of poling time, as measured by TSDC Test Procedure 3.

9. The filter of claim 1, wherein the first electret filter layer collects at least about 70 percent of a challenge aerosol collected by the filter in the DOP Penetration/Loading Test.

10. The filter of claim 1, wherein the first electret filter layer has been quenched and annealed.

11. The filter of claim 1, wherein the initial quality factor of the second electret filter layer is at least about 0.5 or greater as determined using the DOP Penetration/Loading Test.

12. The filter of claim 1, wherein the initial quality factor of the second electret filter layer is at least about 0.6 or greater as determined using the DOP Penetration/Loading Test.

13. The filter of claim 1, wherein the initial quality factor of the second electret filter layer is at least about 0.8 or greater as determined using the DOP Penetration/Loading Test.

14. The filter of claim 1, wherein the second electret filter layer is hydrocharged.

15. The filter of claim 1, wherein the basis weight of the first electret filter layer is greater than the basis weight of the second electret filter layer.

16. The filter of claim 1, wherein the fibers in each of the first and second electret filter layers comprise meltblown fibers.

17. The filter of claim 16, wherein the meltblown fibers are microfibers.

18. The filter of claim 1, wherein the first polymeric material comprises at least one polymer selected from the group consisting of polypropylene, poly(4-methyl-pentene), linear low density polyethylene, polystyrene, polycarbonate, and polyester.

19. The filter of claim 1, wherein the second polymeric material comprises at least one polymer selected from the group consisting of polypropylene, poly(4-methyl-pentene), linear low density polyethylene, polystyrene, polycarbonate, and polyester.

20. The filter of claim 1, wherein the first electret filter layer further comprises a first oily-mist performance-enhancing additive.

21. The filter of claim 20, wherein the first oily-mist performance-enhancing additive comprises a fluorochemical.

22. The filter of claim 1, wherein the second electret filter layer further comprises a second oily-mist performance-enhancing additive.

23. The filter of claim 22, wherein the second oily-mist performance-enhancing additive comprises a fluorochemical.

24. The filter of claim 1, wherein the filter exhibits a pressure-drop of about 12 mm $H_2O$ or less when measured according to the Pressure-Drop Test.

25. The filter of claim 1, wherein the filter exhibits a maximum DOP penetration of about 5% or less after a total exposure to about 200 milligrams of the challenge aerosol during the DOP Penetration/Loading Test.

26. The filter of claim 1, wherein the first and second polymeric materials contain a polymer that has a volume resistivity of greater than $10^{14}$ ohm.cm.

27. The filter of claim 1, which exhibits a nondecreasing removal efficiency at completion of the DOP Penetration/Loading Test.

28. A respirator that comprises the filter of claim 1.

29. A method of removing particulate solid or liquid aerosol from a gas that comprises passing a liquid-aerosol-containing gas through the filter of claim 1, such that the gas encounters the first electret filter layer before encountering the second electret filter layer.

* * * * *